United States Patent [19]

Kennel

[11] 4,059,790

[45] Nov. 22, 1977

[54] NON-OSCILLATING TORQUE CONTROL APPARATUS

[75] Inventor: John M. Kennel, Santa Ana, Calif.

[73] Assignee: Rockwell International Corporation, El Segundo, Calif.

[21] Appl. No.: 733,839

[22] Filed: Oct. 18, 1976

[51] Int. Cl.$^2$ .................... G05B 17/00; H02P 7/00
[52] U.S. Cl. ................................. 318/689; 318/436
[58] Field of Search .............. 318/47, 432, 436, 611, 318/671, 689, 690

[56] References Cited

U.S. PATENT DOCUMENTS

| 3,337,754 | 8/1967 | Hughes | 318/436 |
| 3,354,366 | 11/1967 | Landy, Jr. et al. | 318/600 |
| 3,403,316 | 9/1968 | Conant, Jr. | 318/436 |
| 3,512,069 | 5/1970 | Hughes | 318/436 |

Primary Examiner—Robert K. Schaefer
Assistant Examiner—Michael Mutter
Attorney, Agent, or Firm—H. Fredrick Hamann; Rolf M. Pitts; George Jameson

[57] ABSTRACT

An apparatus is disclosed for generating a non-oscillating torque wherein a magnetic induction torquer having a first coil for clockwise torque and a second coil for counter-clockwise torque is utilized. The coils are selectively driven from a constant current source by way of an assembly of switches and associated precision dummy load impedances. A control circuit is driven by a torque command signal and a clock signal to selectively apply a plurality of control signals to the assembly of switches to cause current pulses to be directed to the appropriate coil or coils of the torquer in order to produce the commanded torque with no oscillating component in the resultant torque.

15 Claims, 7 Drawing Figures

NON-OSCILLATING TORQUE CONTROL APPARATUS

The invention herein described was made in the course of or under a Contract or Subcontract thereunder with the United States Air Force.

BACKGROUND OF THE INVENTION

1. Field of the Invention

This invention relates to a control apparatus and more particularly to an apparatus for developing a non-oscillating torque to control the movement of a movable member, such as a gyroscope rotor, in a non-oscillatory manner.

2. Description of the Prior Art

There are several different types of prior art systems or apparatuses for producing torque. A pulse-on-demand prior art system only applies pulses of power to a torque producing means, such as a torque generator (torquer), gyro or the like, when it is desired to obtain a torque. Because such pulses of power may be randomly produced, this pulse-on-demand system fails to satisfy some basic requirements for the generation of precision torque. These requirements call for (1) a constant torquer current magnitude, and hence constant power dissipation, so that torquer temperature remains constant, and (2) a constant current load on the torque driver so that precision regulation is possible.

The above basic requirements are met in the systems taught in U.S. Pat. No. 3,354,366 (Landy, Jr. et al), and 3,403,316 (Conant, Jr.) by alternately passing constant amplitude positive and negative pulses through the coil of a torquer. Even when the torquer is at or near a null position, alternate positive and negative pulses are applied to the coil of the torquer. These basic requirements are also met in existing systems which utilize two coils (or some even multiple of two coils) on the torquer by supplying constant magnitude pulses to the torquer. In this case torque is controlled by selecting a positive torque coil or a negative torque coil as required, with zero torque being the alternate selection of the positive and negative torque coils. However, each of these above-described systems, which satisfy the basic requirements for generating a precision torque, develops an oscillating torque even when a zero or non-zero torque is desired. Hence, in each of these systems, the implementation for driving the torquers has the disadvantage of gnerating stable platform oscillation at torque rates near zero. In a three axis inertial system such oscillation may also cause unacceptable platform drift.

None of the above-described systems teaches an apparatus which not only satisfies the above-noted basic requirements for generating a precision torque but also develops a zero or non-zero torque without any oscillating component in that torque.

SUMMARY OF THE INVENTION

Briefly, an apparatus is provided for generating a net zero torque without any oscillating component therein when it is desired to maintain a movable member, such as the rotor of a gyro, at a null position without any oscillation about that null position, and for generating a non-oscillating torque when it is desired to move the movable member in a desired direction without any oscillation in the movement.

In a first embodiment, a square law magnetic induction torquer having a first coil for clockwise torque and a second coil for counter-clockwise torque is utilized. The coils are driven from a constant current source by way of a dual H switch and associated precision dummy load impedances. A control circuit is driven by a delta modulated torque command signal and a clock signal to selectively apply a plurality of control signals to the switches in the dual H switch to cause current pulses to be directed to the appropriate coil or coils of the torquer in order to produce' the commanded torque with no oscillating component in the resultant torque.

It is therefore an object of this invention to provide an improved torquing apparatus.

Another object of this invention is to provide a more accurate apparatus for energizing torquers, gyros and the like.

Another object of this invention is to provide an apparatus which generates a precision torque with no oscillating component in that torque.

Another object of this invention is to provide in a first embodiment a square law torquer which generates a non-oscillating torque.

Another object of this invention is to provide in a second embodiment a DC torquer which generates a non-oscillating torque.

A further object of this invention is to provide a non-oscillating torque control apparatus to improve the stability and accuracy of an inertial system.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein.

DESCRIPTION OF THE PREFERRED EMBODIMENTS

Figure 1:
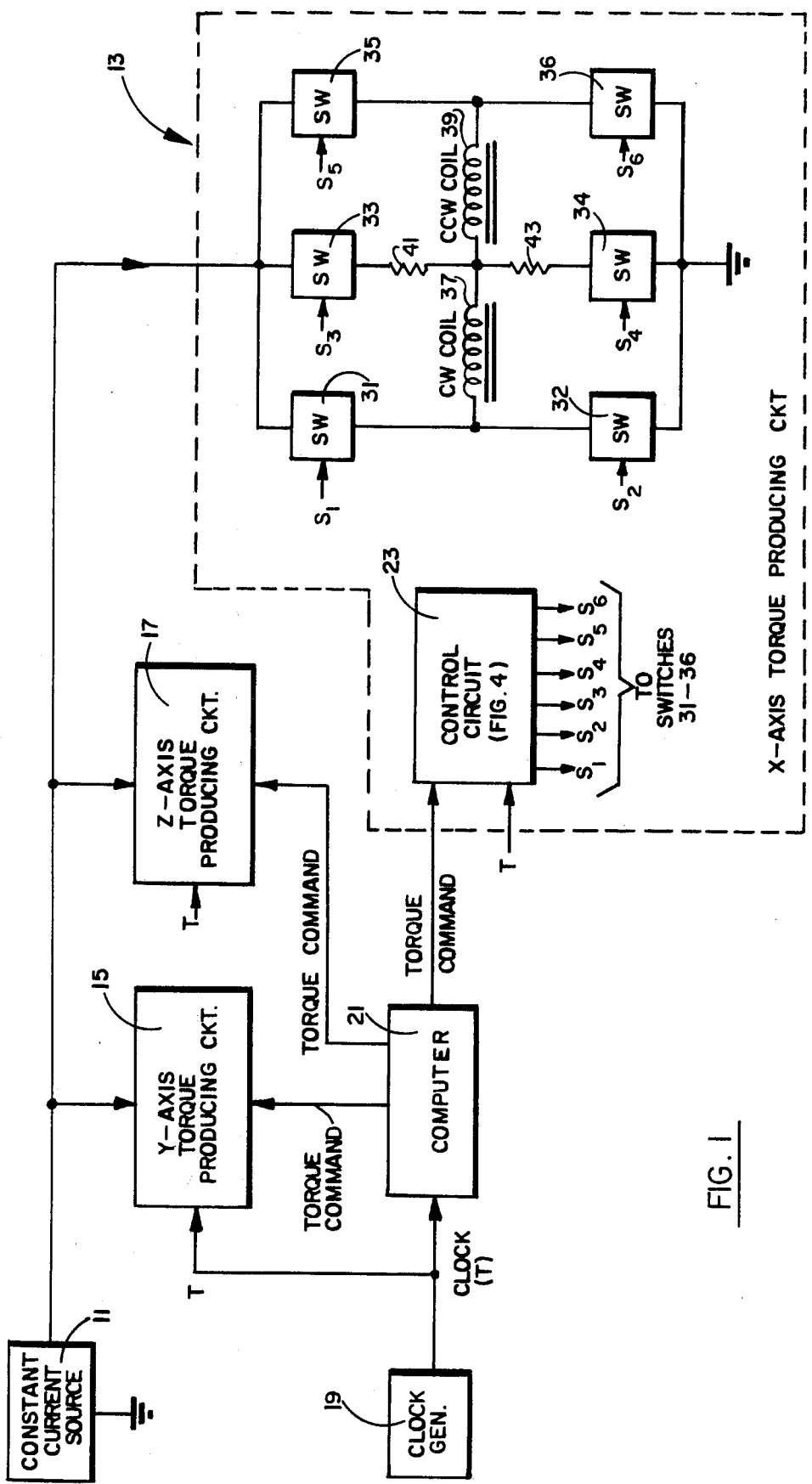
FIG. 1 is a block diagram of a first embodiment of the invention.

Referring now to the drawings, FIG. 1 discloses a block diagram of a first embodiment of the invention. Currents from a constant current source 11 are applied in parallel to similar X-axis, Y-axis and Z-axis torque-producing circuits 13, 15 and 17, respectively. A clock generator 19 applies clock pulses or clocks (T) to each of the torque producing circuits 13, 15 and 17, as well as to a computer 21. The computer 21 may be any suitable digital computer which is internally programmed, or controlled by external signals (not shown), to generate torque command signals to cause the circuits 13, 15 and 17 to generate torques to control the three-space position of, for example, an inertial stabilization system (not shown). These torque command signals are phase-coherent with the clocks (T).

It should be recalled at this time that the invention is directed to a torque control apparatus which develops a non-oscillating torque. As a result, the invention is applicable to a one, two or three axis stabilization system. Because the circuits 13, 15 and 17 are similar in structure and operation, only the circuit 13 is shown in detail in FIG. 1. Therefore, for purposes of the ensuing detailed discussion, the invention will be described in terms of the circuitry and operation required to produce a non-oscillating torque for the X-axis only. Similar circuitry and operation would equally apply for producing torques for the X and Y axes or for the X, Y and Z axes.

The torque command signal from the computer 21 and the clocks T from clock generator 19 are applied to a control circuit 23 in the X-axis torque producing circuit 13. Also included in the torque producing circuit 13 are switches 31 – 36, serially coupled clockwise (CW) and counter-clockwise (CCW) torque generator windings or coils 37 and 39 of a torque generator or gyro or the like (not shown), and serially coupled precision dummy loads impedances 41 and 43 which may be precision resistors.

The switches 31 – 36 may be any suitable electronic or mechanical switches which are coupled together to form a dual H switch assembly. For purposes of this discussion let the switches 31 – 36 be any suitable electronic switches. One side of each of the switches 31, 33 and 35 is commonly connected to the output of the constant current source 11, while one side of each of the switches 32, 34 and 36 is commonly connected to the return side of the source 11 by way of a reference potential, such as ground. The serially coupled CW and CCW coils 37 and 39 are coupled between the junction of switches 31 and 32 and the junction of switches 35 and 36. The serially coupled dummy load resistors 41 and 43 are coupled between the switches 33 and 34. The junction of the coils 37 and 39 is connected to the junction of the resistors 41 and 43 to provide a complete path for precision current flow through either or both of the coils 37 and 39.

It should be noted that the impedances of the coils 37 and 39 and dummy loads 41 and 43 are closely matched to each other in order to provide a substantially constant load impedance on the constant current source 11. Furthermore, each of the CW and CCW coils 37 and 39 is wound to be a square-law torque coil, such that the torque is developed as a function of the square of the current applied to the coil. Therefore, the polarity of current flow through a square-law torque coil is unimportant as far as the direction of torque is concerned. As a result, neither of the coils 37 and 39 is polarity sensitive. In other words, the CW coil 37 will develop a CW torque when current of either polarity is passed through it. In a like manner the CCW coil 39 will develop a CCW torque when current of either polarity is passed through it. In this way the square law torquing of a movable member, such as the rotor of a gyro, is accomplished in one or more axes. It should be further noted that, for purposes of this discussion, the torque command signal from the computer 21 will be described and shown as being delta modulated. A delta modulated torque command signal is utilized in conjunction with the clocks T to enable the switches 31 – 36 in the circuit 13 to also develop biflux torquing (alternately causing positive and negative current pulses to be applied to either or both of the coils 37 and 39). Biflux torquing is used to avoid torque scale factor changes due to magnetic hysteresis. However, although square-law torquers and biflux torquing are utilized in describing the structure and operation of the circuitry of FIG. 1, these are not essential features of the invention. It is only required in this invention that current pulses be selectively switched through either or both of separate CW and CCW torquer coils 37 and 39 in such a manner as to develop a resultant commanded torque with no oscillating component.

The operation of the embodiment of FIG. 1 for a zero torque command will now be explained by also referring to the waveforms illustrated in FIG. 2. The zero torque command from computer 21 and the clock T pulses from clock generator 19 are respectively illustrated in waveforms 51 and 53. It can be seen that the zero torque command 51 has a 50% duty cycle.

In a conventional torquing system which uses two torquer coils (CW and CCW) similar to the coils 37 and 39, various parameters are developed in response to the zero torque command 51 and clock 53. From the zero torque command 51, a CW torque command A (waveform 55) and a CCW torque command $\overline{A}$ (waveform 57) are derived for the CW and CCW coils. As can be seen, the CW torque command waveform 55 is similar to the zero torque command waveform 51, while the CCW torque command waveform 57 is the complement of the waveform 55. The waveform 59 shows that current flows in the CW winding when the CW torque command waveform 55 is positive ('), and that the polarity of the CW winding current depends upon the polarity of the clock waveform 53. In a like manner, the waveform 61 shows that current flows in the CCW winding when the CCW torque command waveform 57 is positive, and that the polarity of the CCW winding current also depends upon the polarity of the clock waveform 53. Biflux torquing is developed from the alternate negative and positive current pulses that flow during each positive portion of the CW (or CCW) torque command waveform 55 (or 57).

The applied torque that results from a conventional torquing system for a zero torque command 51 is illustrated in the waveform 63. The torque in the waveform 63 oscillates around the null point of zero (0) due to the fact that when current is flowing in the CW winding no current is flowing in the CCW winding, and when current is flowing in the CCW winding no current is flowing in the CW winding. As shown by the waveform 65 the total torque power utilized by a conventional torquing system in response to the zero torque command 51 is constant.

In the present improved torquing system, the CW and CCW torque commands 55 and 57 are also derived from the zero torque command 51. However, the control circuit 23 internally delays the CW torque command waveform 55 by the period of one clock (T) 53 (FIG. 4) to develop the delayed CW torque command (B), as shown by waveform 67. The CCW torque command $\overline{A}$ (waveform 57) is not delayed. The waveforms 67 and 57, along with the clock waveform 53 are then utilized by the control circuit 23 (to be explained) to develop control signals $S_1 - S_6$ which are respectively applied to the switches 31 – 36. These $S_1 - S_6$ signals enable the switches 31 – 36 to apply the positive and negative current pulses (of the biflux torquing) simultaneously to the CW and CCW coils 37 and 39, rather than sequentially as is shown by the waveforms 59 and 61 of a conventional torquing system. As a result, the current pulses that are simultaneously applied to the CW and CCW windings or coils 37 and 39 are similar, as shown by the waveforms 71 and 73, respectively. The net torque that results from the simultaneous application to the coils 37 and 39 of the current pulses shown in the waveforms 71 and 73 is zero, as shown by waveform 75, since the CW torque (produced by the current pulses of waveform 71) and the CCW torque (produced by the current pulses of waveform 73) occur simultaneously. A comparison of the waveforms 63 and 75 shows that the conventional torquing system and the improved torquing system of this invention produce the same net torque. However, the conventional torquing system produces an oscillation when zero torque is commanded, whereas the improved torquing system of this invention has no oscillating component in its zero torque. In addition, for zero torque the total torque power (waveform 77) in the improved torquing system of this invention is alternately +2 and 0 as compared to a constant of 1 (unity) for the conventional torquing system. However, the total torque power of this improved torquing system is constant when averaged or integrated over two clock (T) periods.

Figure 3:
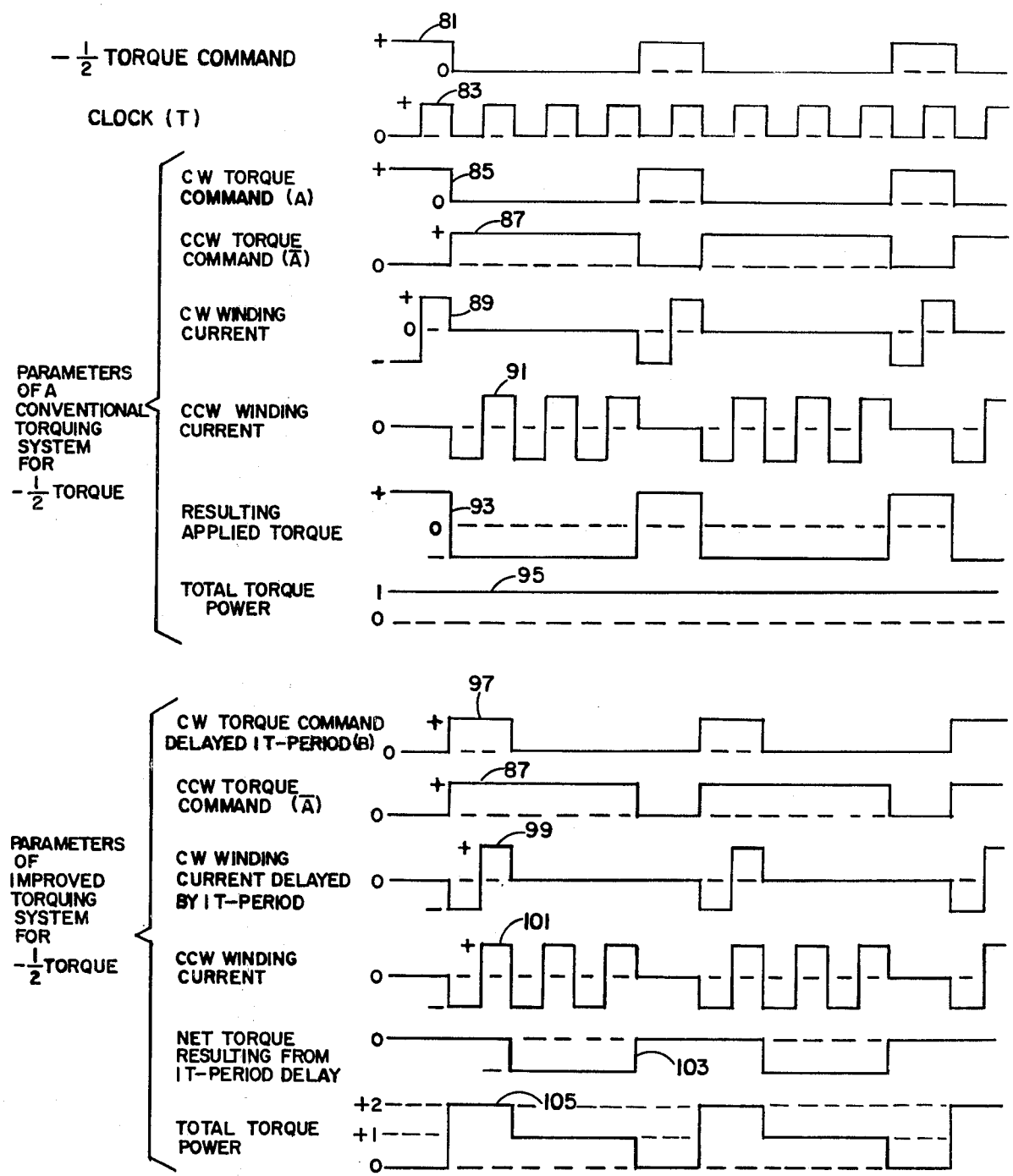

The operation of the embodiment of FIG. 1 for a non-zero torque command, will now be explained by also referring to the waveforms illustrated in FIG. 3. In FIG. 3 the waveforms of a conventional torquing system are compared with the waveforms of the improved torquing system of the invention when a one-half maximum rate negative torque command (or $-\frac{1}{2}$ torque command) is supplied by the computer 23. The $-\frac{1}{2}$ torque command and the clock T are respectively illustrated by the waveforms 81 and 83.

In a conventional torquing system various parameters are developed in response to the $-\frac{1}{2}$ torque command 81 and clock 83. A CW torque command A (waveform 85) and a CCW torque command $\overline{A}$ (waveform 87) are developed from the $-\frac{1}{2}$ torque command 81. The waveform 85 is similar to the waveform 81, while the waveform 87 is the complement of the waveform 85. The CW winding current waveform 89 shows that current flows in the CW winding when the CW torque command waveform 85 is positive (+), and that the polarity of the CW winding current depends upon the polarity of the clock 83. Similarly, the CCW winding current waveform 91 shows that current flows in the CCW winding when the CCW torque command waveform is positive (+), and that the polarity of the CCW winding current depends upon the polarity of the clock 83. The applied torque that results from a conventional torquing system due to the $-\frac{1}{2}$ torque command 81 is illustrated in the waveform 93. Here, again, an oscillation is seen in the waveform 93. By comparing waveform 89 with waveform 91, it can be seen that the resultant oscillating torque of waveform 93 is due to the fact that the CW and CCW torques (produced by the currents 89 and 91) are only developed sequentially. Basically, this oscillating torque 93 causes the movable member that it acts upon (not shown) to move three units forward and one unit back, and then another three units forward and one unit back, and so on as long as the command remains unchanged. Finally, the total power utilized by a conventional torquing system in response to the $-\frac{1}{2}$ torque command 81 is constant, as shown in the waveform 95.

In the improved torquing system of the invention, various different parameters are developed in response to a $-\frac{1}{2}$ torque command 81. The CW and CCW torque commands 85 and 87 are also derived from the $-\frac{1}{2}$ torque command 81. However, the control circuit 23 internally delays the CW torque command 85 by the period of one clock (T) 83 (FIG. 4) to develop the delayed CW torque command (B), as shown by the waveform 97. The CCW torque command $\overline{A}$ (waveform 87) is not delayed. The waveforms 97, 87 and 83 are then utilized by the control circuit 23 (to be explained) to develop a different set of control signals $S_1 - S_6$ than for the zero torque command previously discussed. This different set or sequence of control signals $S_1 - S_6$ enables the switches 31 - 36 to selectively pass current pulses through the CW and CCW coils 37 and 39 such that a resultant non-oscillating $-\frac{1}{2}$ torque is developed by the coils 37 and 39. The positive and negative current pulses that are applied to the CW and CCW windings or coils 37 and 39 are respectively shown in the waveforms 99 and 101. As seen in the waveforms 99 and 101, more current flows through the CCW winding 39 than through the CW winding 37 since a $-\frac{1}{2}$ torque is commanded. However, it should be noted that the CW winding current 99 is applied to the CW winding 37 at the same time as some of the CCW winding current 101 is being applied to the CCW winding 39. Consequently, the net torque that results from the CW and CCW winding currents 99 and 101 contains no oscillating component. As shown in waveform 103, this net torque does not change direction, but moves by steps only in the CCW direction when a $-\frac{1}{2}$ torque is commanded. Here, again, a comparison of the waveforms 93 and 103 shows that the conventional torquing system and the improved torquing system of this invention produce the same net torque. However, the conventional torquing system generates a torque pulse sequence of +1, −1, −1; −1, +1, −1, −1, −1 . . . , while the improved torquing system of this invention generates a torque pulse sequence of 0, 0, −1, −1, 0, 0, −1, −1 . . . . Thus, the improved torquing system of this invention generates the desired torque without any oscillating component in that torque. Finally, for a $-\frac{1}{2}$ torque, the total torque power sequence, as shown in waveform 105, is 0, +2, +1, +1, 0, +2, +1, +1 . . . , where 1 represents the unity of the conventional torquing system. However, the average value of this total torque power is equal to a constant of +1 when averaged over the periods of two clock pulses (T) for any commanded torque, including zero torque. This is necessary since only a one clock period of delay was introduced. If the period of a clock (T) (typically 0.01 second) is small compared to thermal time constants in, for example, the gyro being driven, no temperature change will result from this improved torquing system.

Figure 2:
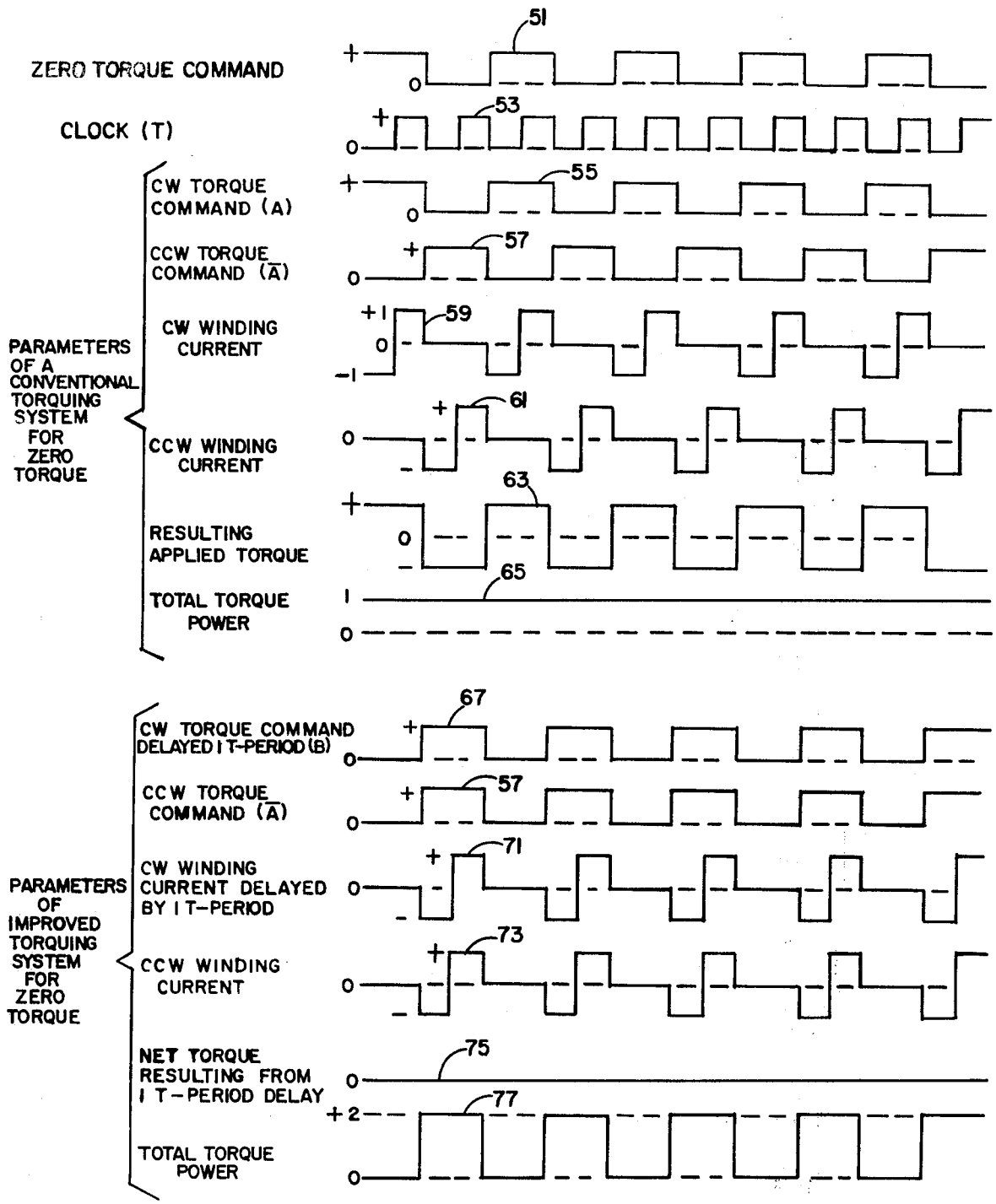
FIGS. 2 and 3 illustrate signal waveforms useful in explaining the operation of the first embodiment of FIG. 1.

In order for the torque producing circuit 13 of FIG. 1 to develop the waveforms 67, 57, 71, 73, 75 and 77 of FIG. 2 for a zero torque command 51 or the waveforms 97, 87, 99, 101, 103 and 105 of FIG. 3 for a $-\frac{1}{2}$ torque command 81, the control circuit 23 must develop different sets of control signals $S_1 - S_6$ in response to clocks (T) and different torque command signals. It will be recalled that the states of the control signals $S_1 - S_6$ selectively control the operation of the switches 31 - 36 to enable current pulses to selectively flow through the coils 37 and 39 to generate zero and $-\frac{1}{2}$ torques, as well as other commanded torques. Table I below shows how the binary states of the control signals $S_1 - S_6$ are controlled are controlled as a function of the binary states of the command signals $\overline{A}$ (The CCW torque command), B (the CW torque command delayed by one T-period) and T (the clock) to generate any desired torque.

TABLE I

| Command Signals | | | Output Control Signals | | | | | | |
|---|---|---|---|---|---|---|---|---|---|
| A̅ | B | T | S₁ | S₂ | S₃ | S₄ | S₅ | S₆ | Coil Current |
| 0 | 0 | 0 | 0 | 0 | 1 | 1 | 0 | 0 | |
| 0 | 0 | 1 | 0 | 0 | 1 | 1 | 0 | 0 | None |
| 1 | 0 | 0 | 0 | 0 | 0 | 1 | 1 | 0 | CCW Coil 39 Only |
| 1 | 0 | 1 | 0 | 0 | 1 | 0 | 0 | 1 | |
| 0 | 1 | 0 | 0 | 1 | 1 | 0 | 0 | 0 | CW Coil 37 Only |
| 0 | 1 | 1 | 1 | 0 | 0 | 1 | 0 | 0 | |
| 1 | 1 | 0 | 0 | 1 | 0 | 0 | 1 | 0 | Both CW & CCW Coils 37 & 39 |
| 1 | 1 | 1 | 1 | 0 | 0 | 0 | 0 | 1 | |

As shown in Table I above, current pulses flow through one, both or neither of the coils 37 and 39, depending upon which two of the switches 31 – 36 are enabled by the associated pair of $S_1 - S_6$ signals. With $S_3$ and $S_4$ being "1" state signals, switches 33 and 34 are closed to enable current to flow through the dummy load impedances 41 and 43. When $S_4$ and $S_5$ are "1" state signals, switches 34 and 35 close to enable a negative current pulse to flow through the CCW coil 39 and the dummy load 43; and when $S_3$ and $S_6$ are "1" state signals, switches 33 and 36 close to enable a positive current pulse to flow through the dummy load 41 and the CCW coil 39. Similarly, switches 32 and 33 are closed by "1" state $S_2$ and $S_3$ signals to enable a negative current pulse to flow through the dummy load 41 and CW coil 37, and switches 31 and 34 are closed by "1" state $S_1$ and $S_4$ signals to enable a positive current pulse to flow through the CW coil 37 and dummy load 43. Finally, switches 32 and 35 are closed by "1" state $S_2$ and $S_5$ signals to enable a negative current pulse to simultaneously flow through both of the CCW and CW coils 39 and 37, and switches 31 and 36 are closed by "1" state $S_1$ and $S_6$ signals to enable a positive current pulse to simultaneously flow through both of the CW and CCW coils 37 and 39. Thus any desired non-oscillating torque can be obtained by selectively enabling the switches 31 – 36, as indicated in Table I.

Since the impedances of the dummy loads 41 and 43 and CW and CCW coils 37 and 39 are substantially matched to each other and constant magnitude pulses are supplied by way of the switches 31 – 36, the load impedance on the constant current source 11 remains constant so that precision regulation is possible, and a constant power dissipation occurs over the period of two clocks (T) so that the torquer temperature remains constant.

Figure 4:
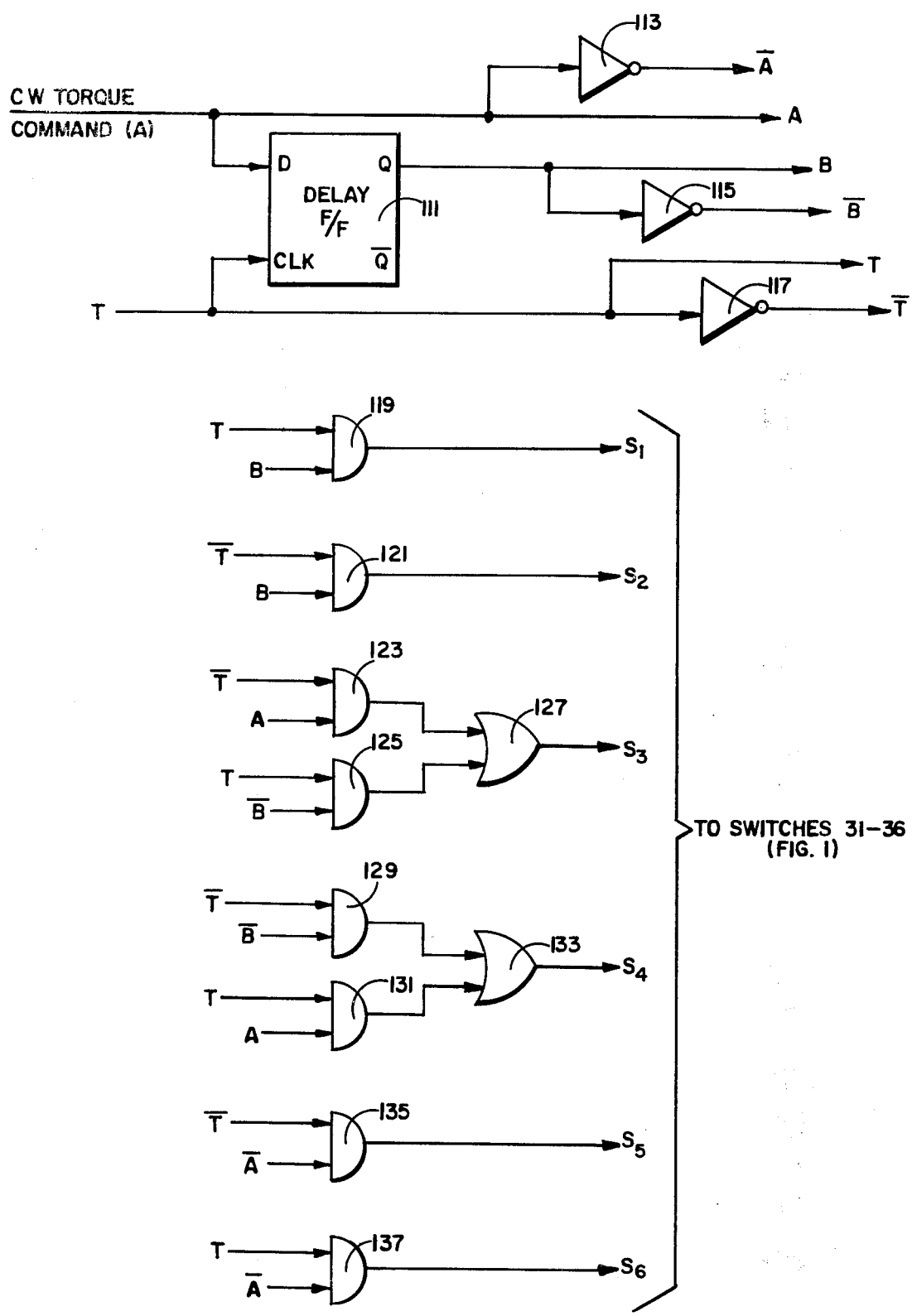
FIG. 4 is a block diagram of the control circuit of FIG. 1.

From Table I the following Boolean equations for $S_1 - S_6$ can be derived:

$S_1 = T A B + T \overline{A} B = T B$
$S_2 = \overline{T} A B = \overline{T} \overline{A} B + \overline{T} B$
$S_3 = \overline{T} A \overline{B} + T A \overline{B} + T \overline{A} \overline{B} + \overline{T} A B = \overline{T} A + T \overline{B}$
$S_4 = \overline{T} A \overline{B} + T A \overline{B} + \overline{T} \overline{A} \overline{B} + T A B = \overline{T} \overline{B} + T A$
$S_5 = \overline{T} \overline{A} B + \overline{T} \overline{A} B = \overline{T} \overline{A}$
$S_6 = T \overline{A} \overline{B} + T \overline{A} B = T \overline{A}$ These Boolean equations for $S_1 - S_6$ are implemented in the control circuit 23, which will now be discussed by referring to FIG. 4.

In FIG. 4, the CW torque command signal A (which is logically the same as the torque command signal from computer 21 of FIG. 1) is applied to the D input of a D-type delay flip flop 111, which is clocked by the clock T. As clearly shown in FIG. 2, the frequency of the clock T is twice as high as that of the torque command signal. At each falling edge of the clock T the flip flop transfers to its Q output the state of the CW torque command signal A that existed at the D input before the falling edge of the clock T. The flip flop 111 holds this output state until the next falling edge of the clock T even though the binary state of the A signal may have changed at the time of the falling edge of the clock T. Thus, the B signal that is developed at the Q output of the flip flop 111 is the CW torque command signal A delayed by the period of one clock (T). The A, B and T signals are logically inverted by inverters 113, 115 and 117 to develop $\overline{A}$ (the CCW command signal), $\overline{B}$ and $\overline{T}$, respectively. The $\overline{A}$, A, B, $\overline{B}$, T and $\overline{T}$ signals are utilized by the remaining circuitry in the control circuit 23 to develop the control signals $S_1 - S_6$.

The signals T and B are applied to AND gate 119 to develop the $S_1$ signal, while the $\overline{T}$ and B signals are applied to AND gate 121 to develop the $S_2$ signal. The inputs to AND gate 123 are $\overline{T}$ and A, and the inputs to AND gate 125 are T and $\overline{B}$. The outputs of AND gates 123 and 125 are applied to OR gate 123 to develop the $S_3$ signal. Similarly, the inputs to AND gate 129 are $\overline{T}$ and $\overline{B}$, while the inputs to AND gate 131 are T and A. The outputs of AND gates 129 and 131 are applied to OR gate 133 to develop the $S_4$ signal. The signals $\overline{T}$ and $\overline{A}$ are applied to AND gate 135 to develop the $S_5$ signal, while the signals T and $\overline{A}$ are applied to AND gate 137 to develop the $S_6$ signal.

Figure 5:
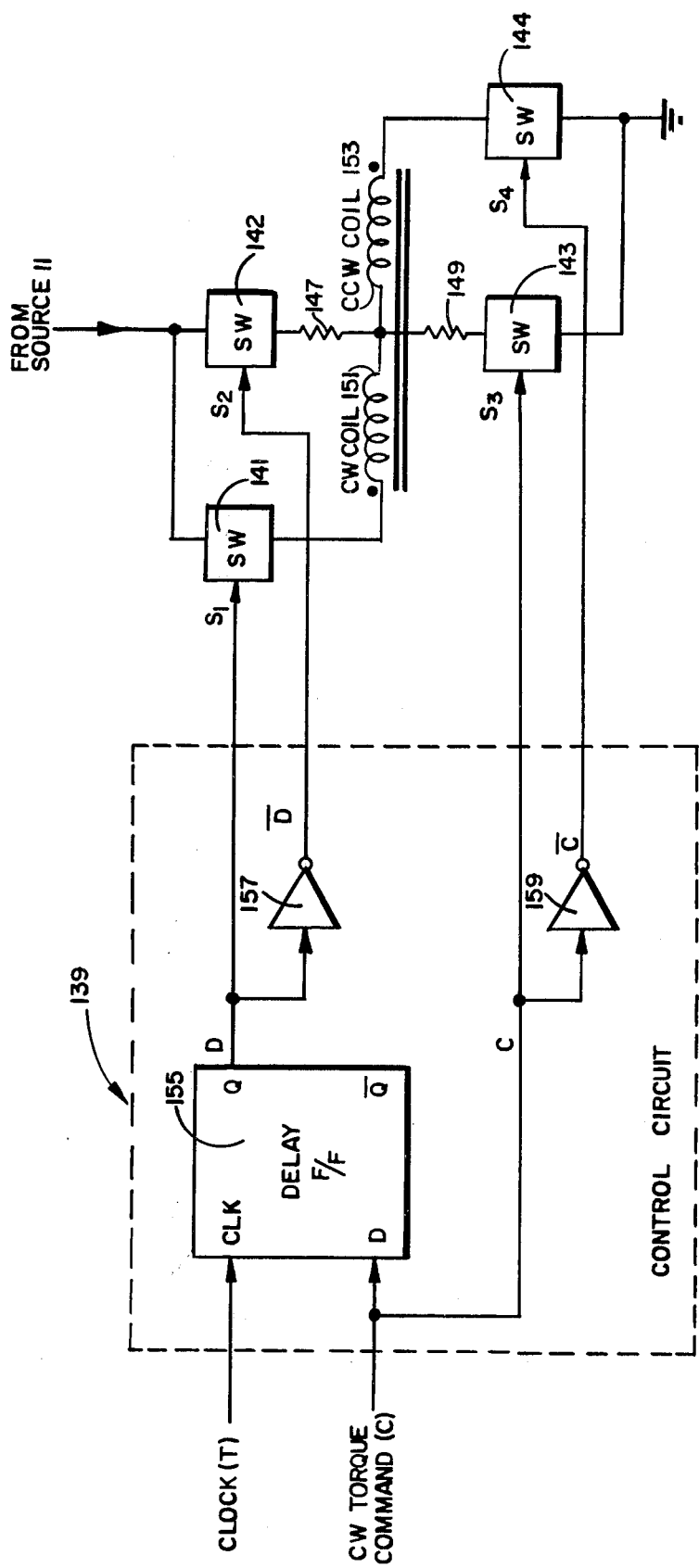
FIG. 5 is a block diagram of a modification that can be made in each of the torque producing circuits of FIG. 1 to derive a second embodiment of the invention.

Referring now to FIG. 5, a second embodiment of the invention is illustrated. Basically, FIG. 5 is a block diagram of a modified torque producing circuit that can be used in the system of FIG. 1 to derive the second embodiment of the invention. This second embodiment of FIG. 5 may be called a DC torquing embodiment, as contrasted with the square law torquing embodiment of FIG. 1.

The DC torquing embodiment of FIG. 5 includes a control circuit 139, switches 141 – 144, serially-connected dummy load impedances 147 and 149 which may be precision resistors, and serially-connected CW and CCW windings or coils 151 and 153. A first side of each of the switches 141 and 142 is commonly connected to the output of the constant current source 11, and a first side of each of the switches 143 and 144 is commonly connected to the return input of the source 11 by way of a reference potential such as ground. The serially-connected dummy loads 147 and 149 are connected between the second sides of switches 142 and 143, while the serially-connected coils 151 and 153 are connected between the second sides of switches 141 and 144. The junction of the coils 151 and 153 is connected to the junction of the dummy loads 147 and 149 to provide a complete path for current to flow from the source 11 to ground as the switches 141 – 144 are selectively enabled.

Switches 141 – 144 may be any suitable electronic or mechanical switches. However, for purposes of this discussion let switches 141 – 144 be any suitable electronic switches. The CW and CCW coils 151 and 153 are wound to be polarity sensitive coils. Any torque generated by either of the coils 151 and 153 responds in a polarity sensitive manner which is determined by the direction of current flow through that coil. To show the polarization of each of the coils 151 and 153, the positive side of each coil is designated with a dot. Thus, when current enters the dotted side of a coil, that current can be considered to be a positive current since it produces a magnetic field which produces a CW torque. In a like manner, when current enters the undotted side of a coil, that current can be considered to be a negative current since it produces a magnetic field which produces a CCW torque. The impedances of these coils 151 and 153 and of the dummy loads 147 and 149 are closely matched to each other to provide a substantially constant load impedance on the constant current source 11.

In operation, the clock (T) from clock generator 19 (FIG. 1) and the torque command from computer 21 (FIG. 1) are applied to the control circuit 139 to enable the circuit 139 to generate $S_1 - S_4$ signals to respectively control the operation of the switches 141 - 144. As will be explained, the control circuit 139 separates the torque command into a CW torque command C and a CCW torque command $\overline{C}$, and delays the CW torque command C for one clock (T) period to develop a delayed CW torque command D. It is desired that the control circuit 139 be implemented to develop the output control signals $S_1 - S_4$ for controlling the switches 141 - 144, and hence the currents through CW and CCW coils 151 and 153, in response to the CCW torque command $\overline{C}$ and the delayed CW torque command D signals, as shown in Table II below.

TABLE II

| Command Signals | | Output Control Signals | | | | |
|---|---|---|---|---|---|---|
| $\overline{C}$ | D | $S_1$ | $S_2$ | $S_3$ | $S_4$ | Coil Current |
| 0 | 0 | 0 | 1 | 1 | 0 | None |
| 0 | 1 | 1 | 0 | 1 | 0 | CW Coil 151 Only |
| 1 | 0 | 0 | 1 | 0 | 1 | CCW Coil 153 Only |
| 1 | 1 | 1 | 0 | 0 | 1 | Both CW & CCW Coils 151 & 153 |

From Table II the following Boolean equations for $S_1 - S_4$ can be derived.

$S_1 = C D + \overline{C} D = D$
$S_2 = C \overline{D} + \overline{C} \overline{D} = \overline{D}$
$S_3 = C \overline{D} + C D = C$
$S_4 = \overline{C} \overline{D} + \overline{C} D = \overline{C}$ These Boolean equations for $S_1-S_4$ are implemented in the control circuit 139 of FIG. 5, as discussed below.

In the control circuit 139 of FIG. 5, the CW torque command C (which is logically the same as the torque command signal from computer 21 of FIG. 1) is applied to the D input of a D-type delay flip flop 155, which is clocked by the clock T from clock generator 19 (FIG. 1). The flip flop 155, which is similar in operation to the flip flop 111 of FIG. 4, is clocked by the falling edge of the clock T to develop the D signal as its Q output. It will be recalled that this D signal is a CW torque command that is delayed by one period of the clock T. The D and C signals are logically inverted by inverters 157 and 159 to develop $\overline{D}$ and $\overline{C}$ signals. The $\overline{C}$ and D signals are the CCW and delayed CW torque command signals, respectively, from which the output control signals $S_1 - S_4$ are derived. More particularly, the D, $\overline{D}$, C and $\overline{C}$ signals are the $S_1 - S_4$ control signals which are utilized by the switches 141 - 144, respectively, to selectively control the currents flowing through the coils 151 and 153, and hence the resultant torque produced by those coils.

As shown in Table II above and in FIG. 5, current pulses flow through one, both or neither of the coils 151 and 153, depending upon which two of the switches 141 - 144 are enabled by the associated pair of $S_1 - S_4$ signals. When $S_2$ and $S_3$ are "1" state signals, switches 142 and 143 are closed to enable current to flow from the source 11 through the dummy loads 147 and 149. Thus, no current flows through either of the coils 151 and 153 when the switches 142 and 143 are closed. However, switches 141 and 143 are closed by "1" state $S_1$ and $S_3$ signals to enable only a positive current pulse to flow through the CW coil 151 and the dummny load 149. Similarly, switches 142 and 144 are closed by "1" state $S_2$ and $S_4$ signals to enable only a negative pulse to flow through the CCW coil 153 by way of the dummy load 147. Finally, switches 141 and 144 are closed by "1" state $S_1$ and $S_4$ signals to simultaneously enable a positive current pulse to flow through the CW coil 151 and a negative current pulse to flow through the CCW coil 153.

Figure 6:
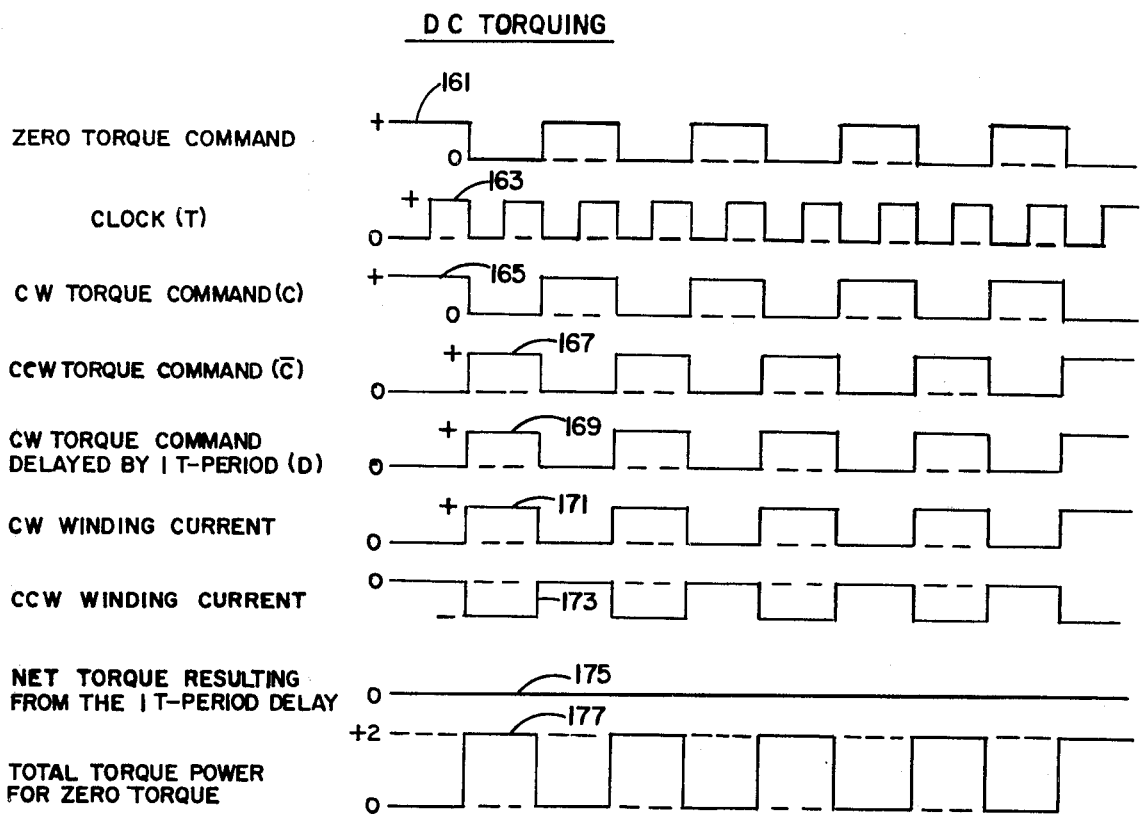
FIGS. 6 and 7 illustrate signal waveforms useful in explaining the operation of the torque producing circuit of FIG. 5.

The operation of the embodiment of FIG. 5 for a zero torque command will now be explained by also referring to the waveforms illustrated in FIG. 6. A zero torque command 161 and clock (T) 163 are respectively applied from the computer 21 and clock generator 19 of FIG. 1. A CW torque command (C) 165 and CCW torque command ($\overline{C}$) 167 are derived from the zero torque command 161 by respectively repeating and inverting the zero torque command. The inverter 159 inverts the CW torque command (C) 165 to develop the CCW torque command ($\overline{C}$) 167. The flip flop 155 delays the CW torque command (C) 165 by the period of one clock (T) 163 to develop the delayed CW torque command (D) 169. The states of the signals $\overline{C}$ and D (waveforms 167 and 169) are then utilized by the control circuit 139 to produce the states of the signals $S_1 - S_4$, as shown in Table I, which in turn develop the CW and CCW winding currents shown in waveforms 171 and 173, respectively. As shown in the waveforms 171 and 173, positive pulses of CW winding currents (through CW coil or winding 151) occur simultaneously with the negative pulses of CCW winding current (through CCW coil or winding 153). Therefore, the currents 171 and 173 simultaneously produce opposing CW and CCW torques in the coils 151 and 153, resulting in a net torque of zero (waveform 175). This net torque 175 contains no oscillating component. As shown by the waveform 177, the total torque power for zero torque is constant when averaged over the periods of two clocks (T).

Figure 7:
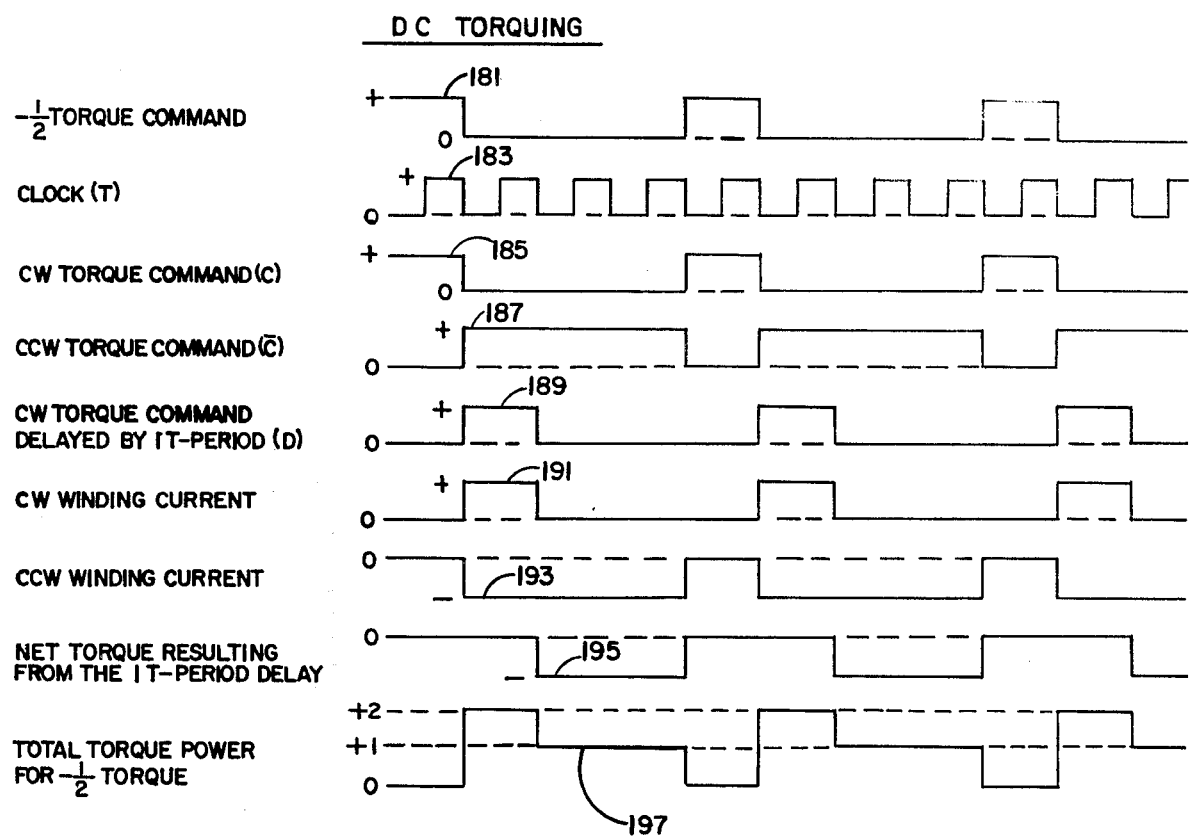

In a similar manner, the operation of the embodiment of FIG. 5 for a non-zero torque command will now be explained by also referring to the waveforms illustrated in FIG. 7. For example, a one-half maximum rate negative torque command (or $-\frac{1}{2}$ torque command) 181 is supplied by the computer 23 (FIG. 1). A CW torque command (C) 185 and CCW torque command ($\overline{C}$) 187 are derived from the $-\frac{1}{2}$ torque command 181 by respectively repeating and inverting the torque command 181. The inverter 159 inverts the CW torque command (C) 185 to develop the CCW torque command ($\overline{C}$) 187, and the flip flop 155 delays the CW torque command (C) 185 by one clock (T) 183 period to develop a delayed CW torque command (D) 189. Table II is equally applicable in FIG. 7 to show how the states of the $\overline{C}$ and D commands selectively control the states of the signals $S_1 - S_4$ to develop CW and CCW winding currents 191 and 193, respectively. The current pulses 191 and 193, which are of opposite polarities produce opposing CW and CCW torques in the coils 151 and 153, resulting in a net torque 195. By comparing waveforms 191 and 193, it can be seen that the current 191 is applied to the CW winding 151 at the same time as some of the current 193 is applied to the CCW winding 153. Hence, the torque produced by the CW winding current 191 is cancelled by a portion of the torque produced by the CCW winding current 193. As a result, there is no oscillating component in the net torque 195. As shown in the waveform 195, this net torque does not change direction, but moves by steps only in the CCW direction when a $-\frac{1}{2}$ torque is commanded. Finally, as illustrated in the waveform 197, the total torque power for $-\frac{1}{2}$ torque is constant when averaged over the periods of two clocks (T).

Torques other than zero or $-\frac{1}{2}$ can be developed by the circuit of FIG. 5 by selectively enabling the switches 141 – 144, as indicated in Table II.

As discussed before, the impedances of the dummy loads 147 and 149 and CW and CCW coils 151 and 153 are substantially matched to each other, and constant magnitude pulses are supplied by way of the switches 141 – 144. Consequently, the load impedance on the constant current source 11 remains constant so that precision regulation is possible. In addition, a constant power dissipation occurs over the period of two clocks (T) so that torquer temperature remains constant.

The invention thus provides an apparatus which develops a constant load on the current source, constant power dissipation in the torquer and a selectable range of non-oscillating torques from zero to maximum in either of CW and CCW directions. More specifically, the apparatus of this invention utilizes a magnetic induction torquer having a first coil for clockwise torque and a second coil for counter-clockwise torque. The coils are selectively driven from a constant current source by way of an assembly of switches and associated precision dummy load impedances. In response to torque command and clock signals, a control circuit derives clockwise (CW and counter-clockwise (CCW) torque command signals and used these command signals to selectively generate a plurality of control signals. These control signals are selectively applied to an assembly of switches to cause current pulses to be directed to either, both or neither of the first and second coils to produce the commanded torque with no oscillating component in the resultant torque.

While the salient features have been illustrated and described in two embodiments of the invention, it should be readily apparent to those skilled in the art that many changes and modifications can be made in those embodiments without departing from the spirit and scope of the invention. For example, a constant pulse source could be substituted for the constant current source. Also, the CCW torque command signal, rather than the CW torque command signal, could be delayed. It is therefore intended to cover all such changes and modifications of the invention that fall within the spirit and scope of the invention as set forth in the appended claims.

I claim:

1. A torque producing apparatus comprising:
a source of current;
first means for producing a clockwise torque in response to current therethrough from said source;
second means for producing a counterclockwise torque in response to current therethrough from said source,
switching means responsive to a plurality of control signals for selectively coupling said first and second means to said source; and
control means responsive to a torque command signal for selectively generating the plurality of control signals as a function of the torque command signal, said plurality of control signals enabling said switching means to selectively control the flow of current through said first and second means such that the clockwise and counter-clockwise torques combine into a resultant non-oscillating torque corresponding to the torque commanded by the torque command signal.

2. The apparatus of claim 1 further including:
first and second dummy loads coupled to said first, and second switching means, said switching means being controlled by the plurality of control signals to selectively pass current from said source through combinations of said first and second means and first and second dummy loads in order to generate the resultant non-oscillating torque under constant load impedance and constant power dissipation conditions.

3. An apparatus comprising:
a source of current;
a first junction;
a torquer having first and second coils coupled together at said first junction;
first and second dummy loads coupled together at said first junction;
switching means responsive to a plurality of control signals for selectively coupling said first and second coils and first and second dummy loads to said source; and
control means responsive to a torque command signal for generating the plurality of control signals to enable said switching means to pass current from said source through selected ones of said coils and dummy loads to develop a desired resultant non-oscillating torque corresponding to the torque commanded by the torque command signal.

4. The apparatus of claim 3 wherein said control means comprises:
means responsive to the torque command signal for developing complementary first and second torque command signals;
means for delaying the first torque command signal for a preselected time period to develop a delayed first torque command signal; and
means responsive to the second and delayed first torque command signals for generating the plurality of control signals.

5. The apparatus of claim 4 wherein said generating means comprises:
a first circuit for developing clock pulses, each clock pulse having an interpulse period equal in duration to that of the preselected time period;
means for developing the complements of the clock pulses and second and delayed first torque command signals; and
gating means selectively responsive to the clock pulses and second and delayed first torque command signals and to the complements of the clock pulses and second and delayed first torque command signals for generating the plurality of control signals.

6. The apparatus of claim 5 wherein:
said switching means comprises six switches coupled together and to the coils and dummy loads in a dual H configuration.

7. The apparatus of claim 5 further including second and third junctions and wherein:
said sources of current has first and second terminals;

said switching means comprises first, second, third, fourth, fifth and sixth switches each having first and second sides, said first sides of said first, second and third switches being coupled to said first terminal, said first sides of said fourth, fifth and sixth switches being coupled to said second terminal, said second sides of said first and fourth switches being coupled together at said second junction, said second sides of said third and sixth switches being coupled together at said third junction;

said first and second dummy loads are coupled between said second sides of said second and fifth switches; and said first and second coils are coupled between said second and third junctions.

8. The apparatus of claim 4 wherein said generating means comprises:

means for developing the complements of the second and delayed first torque command signals, the second and delayed first torque command signals and complements of the second and delayed first torque command signals being the plurality of control signals applied to said switching means.

9. The apparatus of claim 8 wherein:

said source of current has first and second terminals;

said switching means comprises first, second, third and fourth switches each having first and second sides, said first sides of said first and second switches being coupled to said first terminal, said first sides of said third and fourth switches being coupled to said second terminal;

said first and second dummy loads are coupled between the second sides of said second and third switches; and said first and second coils are coupled in phase opposition between the second sides of said first and fourth switches.

10. A torque-producing apparatus for controlling the movement of a movable member in a non-oscillating manner, said apparatus comprising:

a source of constant current;

a torquer having first and second coils, said first coil being responsive to current flow therethrough for producing a first torque in a first direction, said second coil being responsive to current flow therethrough for producing a second torque in a second direction;

switching means being responsive to a plurality of control signals for selectively coupling said first and second coils to said source to enable said first and second coils to selectively produce the first and second torques which combine to produce a desired resultant non-oscillating torque; and control means responsive to a torque command signal for selectively generating the plurality of control signals as a function of the torque command signal.

11. An apparatus for producing a desired non-oscillating torque, and apparatus comprising:

a source of constant current;

a torquer having first and second coils, said first coil being responsive to current flow therethrough for producing a first torque in a first direction, said second coil being responsive to current flow therethrough for producing a second torque in a second direction;

switching means responsive to a plurality of control signals for selectively coupling said first and second coils to said source; and control means responsive to a torque command signal for selectively generating the plurality of control signals to enable said switching means to selectively allow current from said source to develop said torques in said first and second coils, which torques combine into a resultant non-oscillating torque corresponding to the torque commanded by the torque command signal.

12. A torque-producing apparatus for controlling the movement of a movable member in a non-oscillatory manner, said apparatus comprising:

a source of constant current;

a torquer having first and second coils, each of said coils being responsive to the flow therethrough of current from said source for producing a torque;

switching means being responsive to a plurality of control signals for selectively coupling said first and second coils to said source such that the torques developed by said first and second coils occur simultaneously to produce a composite non-oscillating torque of zero when no movement of said movable member is desired, and such that the torques developed by said first and second coils develop a composite non-oscillating torque which moves the movable member by steps in a desired direction of movement when such movement of the movable member is desired; and control means for generating the plurality of control signals.

13. An apparatus comprising:

a source of constant current;

first and second torque producing means coupled together, said first torque producing means being responsive to current flow therethrough for producing a torque in a first direction, said second torque producing means being responsive to current flow therethrough for producing a torque in a second direction, said torques of said first and second torque producing means combining into a composite torque;

control means being responsive to an input torque command signal for selectively generating a plurality of control signals as a function of the input torque command signal, said control means including: first means responsive to the input torque command signal for developing complementary first and second torque command signals therefrom, second means for delaying said second torque command signal to develop a delayed torque command signal, third means responsive to said first and delayed torque command signals for developing the plurality of control signals; and switching means being responsive to the plurality of control signals for selectively coupling said first and second torque producing means to said source to enable said first and second torque producing means to cooperatively produce a non-oscillating composite torque corresponding to the torque commanded by the input torque command signal.

14. A torque producing apparatus comprising:

a source of constant current, said source having output and return terminals;

first, second, third and fourth switches each having first and second sides, said first sides of said first and second switches being coupled to said output terminal, said first sides of said third and fourth switches being coupled to said return terminal;

a first junction;

first and second dummy loads coupled together at said first junction and coupled between said second sides of said second and third switches;

a torquer having first and second coils coupled together at said first junction and coupled between said second sides of said first and fourth switches, said first coil being responsive to current flow therethrough for producing a first torque in a first direction, said second coil being responsive to current flow therethrough for producing a second torque in a second direction, said first and second torques combining into a composite torque, and control means responsive to a torque command signal for generating a plurality of control signals to enable said switches to selectively pass current from said source through said coils and dummy loads to develop a desired non-oscillating composite torque in the direction commanded by the torque command signal.

15. A torque producing apparatus comprising:

a source of constant current, said source having output and return terminals;

first, second and third junctions;

first, second, third, fourth, fifth and sixth switches each having first and second sides, said first sides of said first, second and third switches being coupled to said output terminals, said first sides of said fourth, fifth and sixth switches being coupled to said return terminal, said second sides of said first and fourth switches being coupled together at said first junction, said second sides of said third and sixth switches being coupled together at said second junction;

a torquer having first and second coils, said first and second coils being coupled together at said third junction and being coupled between said first and second junctions, said first coil being responsive to current therethrough for producing a first torque in a first direction, said second coil being responsive to current flow therethrough for producing a second torque in a second direction, said first and second torques combining into a composite torque;

first and second dummy loads coupled together at said third junction and coupled between said second sides of said second and fifth switches; and control means responsive to a torque command signal for generating a plurality of control signals to enable said switches to selectively pass current from said source through said coils and said dummy loads to develop a desired non-oscillating composite torque in the direction commanded by the torque command signal.

* * * * *